US006341225B1

(12) United States Patent
Blanc

(10) Patent No.: US 6,341,225 B1
(45) Date of Patent: Jan. 22, 2002

(54) METHOD FOR IMPROVING PERFORMANCES OF A MOBILE RADIOCOMMUNICATION SYSTEM USING POWER CONTROL

(75) Inventor: Patrick Blanc, Issy les Moulineaux (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/332,939

(22) Filed: Jun. 15, 1999

(30) Foreign Application Priority Data

May 21, 1999 (EP) .......................................... 99401229

(51) Int. Cl.[7] .............................................. H04B 1/00
(52) U.S. Cl. ......................... 455/522; 455/69; 370/335
(58) Field of Search .................. 455/69, 522; 370/335, 370/342, 320

(56) References Cited

U.S. PATENT DOCUMENTS 5,333,175 A 7/1994 Ariyavistakul et al.
5,655,220 A 8/1997 Weiland et al.
5,774,785 A 6/1998 Karlsson
6,085,108 A * 7/2000 Knutsson et al. ........... 455/522

FOREIGN PATENT DOCUMENTS

EP 0 853 393 A1 7/1998
WO WO 98/58461 12/1998

* cited by examiner

*Primary Examiner*—Lee Nguyen
(74) *Attorney, Agent, or Firm*—Sughrue Mion, PLLC

(57) ABSTRACT

A method for improving performances of a mobile radiocommunication system using a power control loop which controls power according to a transmission quality target value, and an adjustment process for adjusting the transmission quality target value, a method wherein the adjustment process is limited, based on the thus controlled power reaching a maximum value.

18 Claims, 5 Drawing Sheets

FIG_1
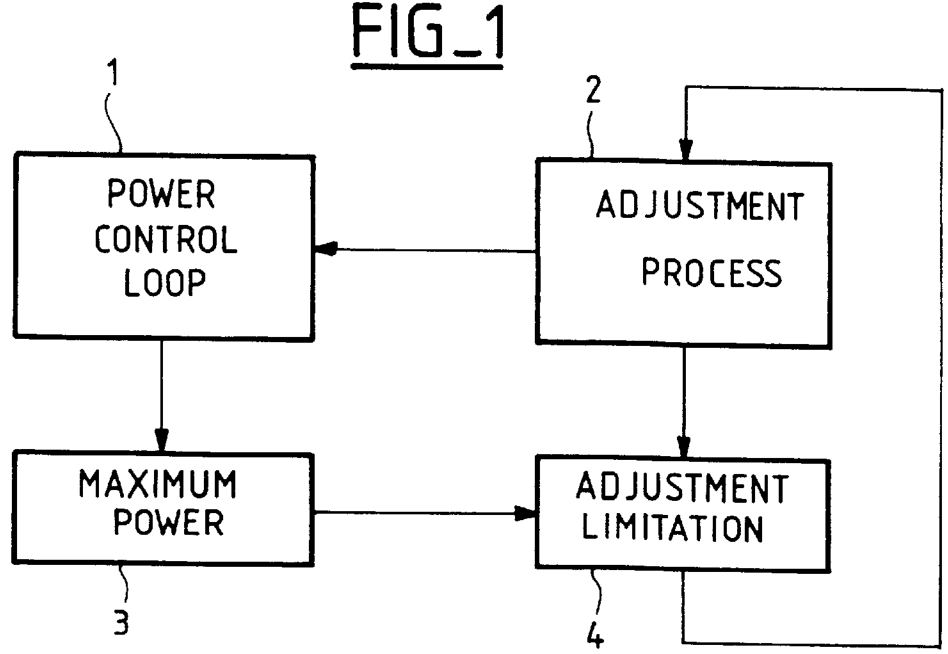
FIG_2
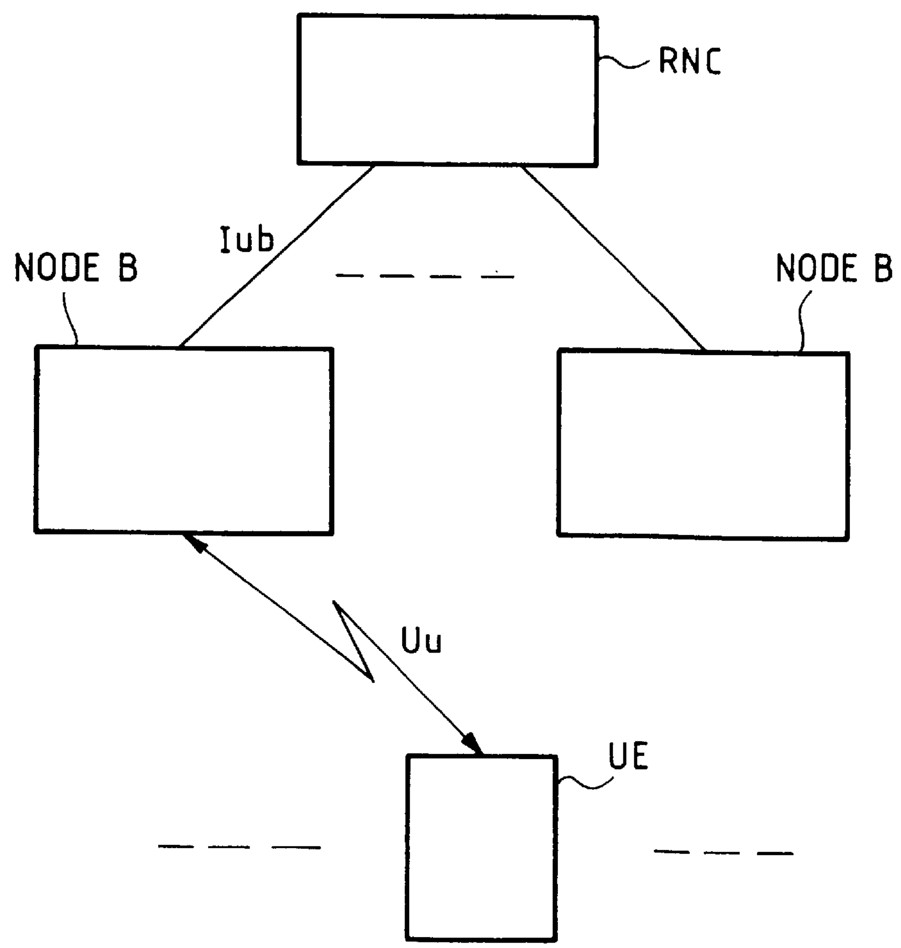

FIG_3
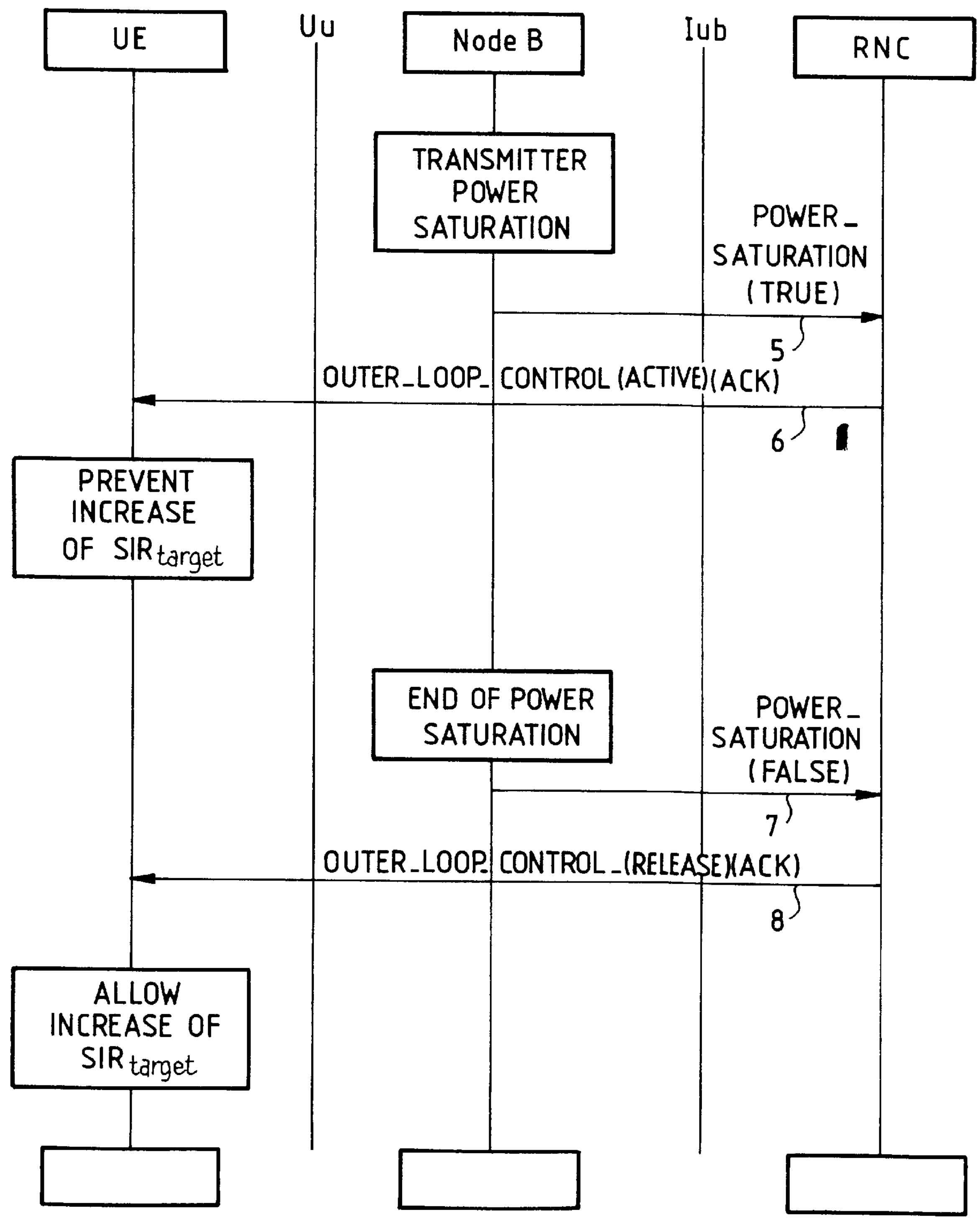

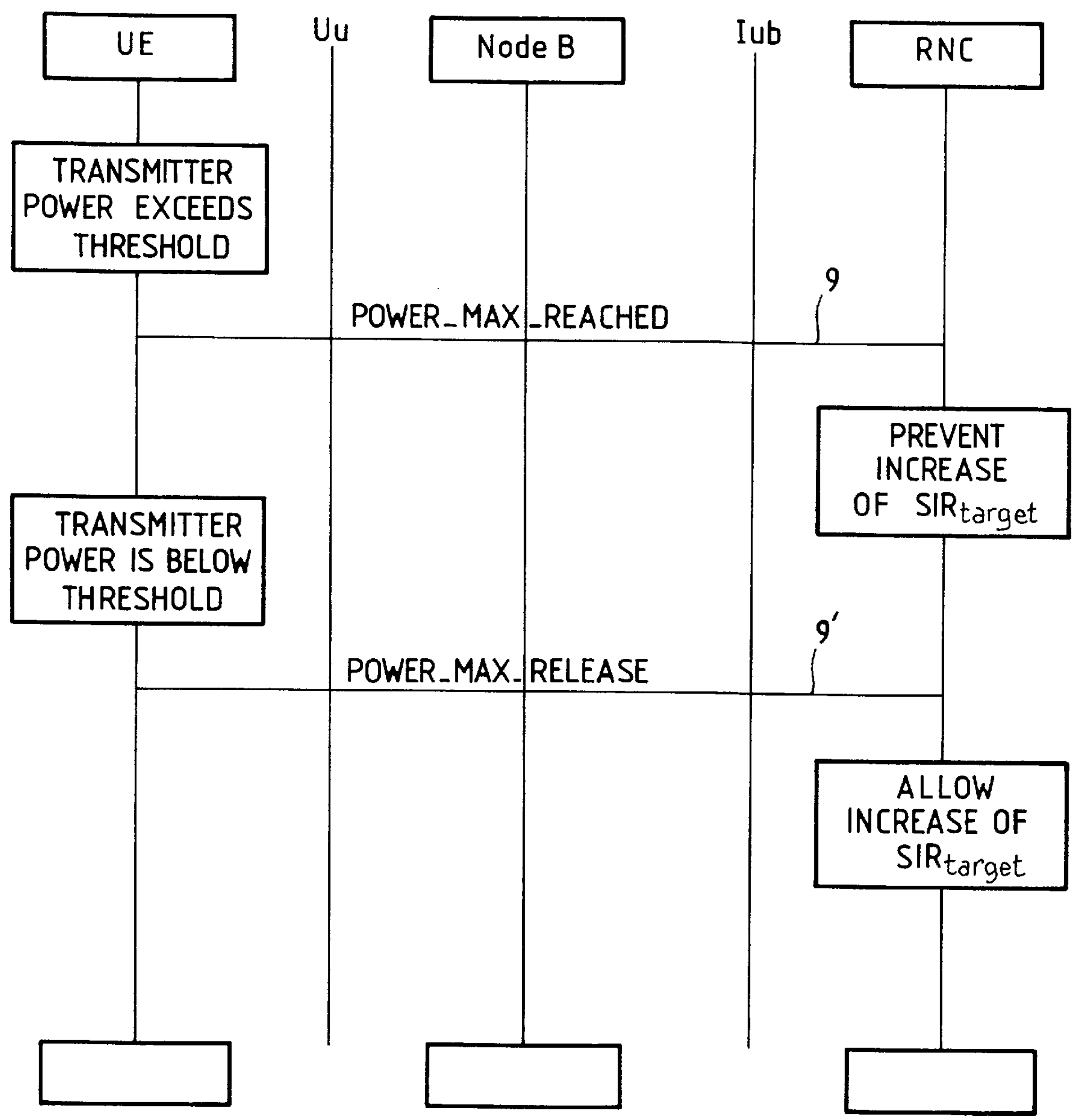
FIG_4
UE
Uu
Node B
Iub
RNC
TRANSMITTER POWER EXCEEDS THRESHOLD
9
POWER_MAX_REACHED
PREVENT INCREASE OF SIRtarget
TRANSMITTER POWER IS BELOW THRESHOLD
9'
POWER_MAX_RELEASE
ALLOW INCREASE OF SIRtarget FIG_5
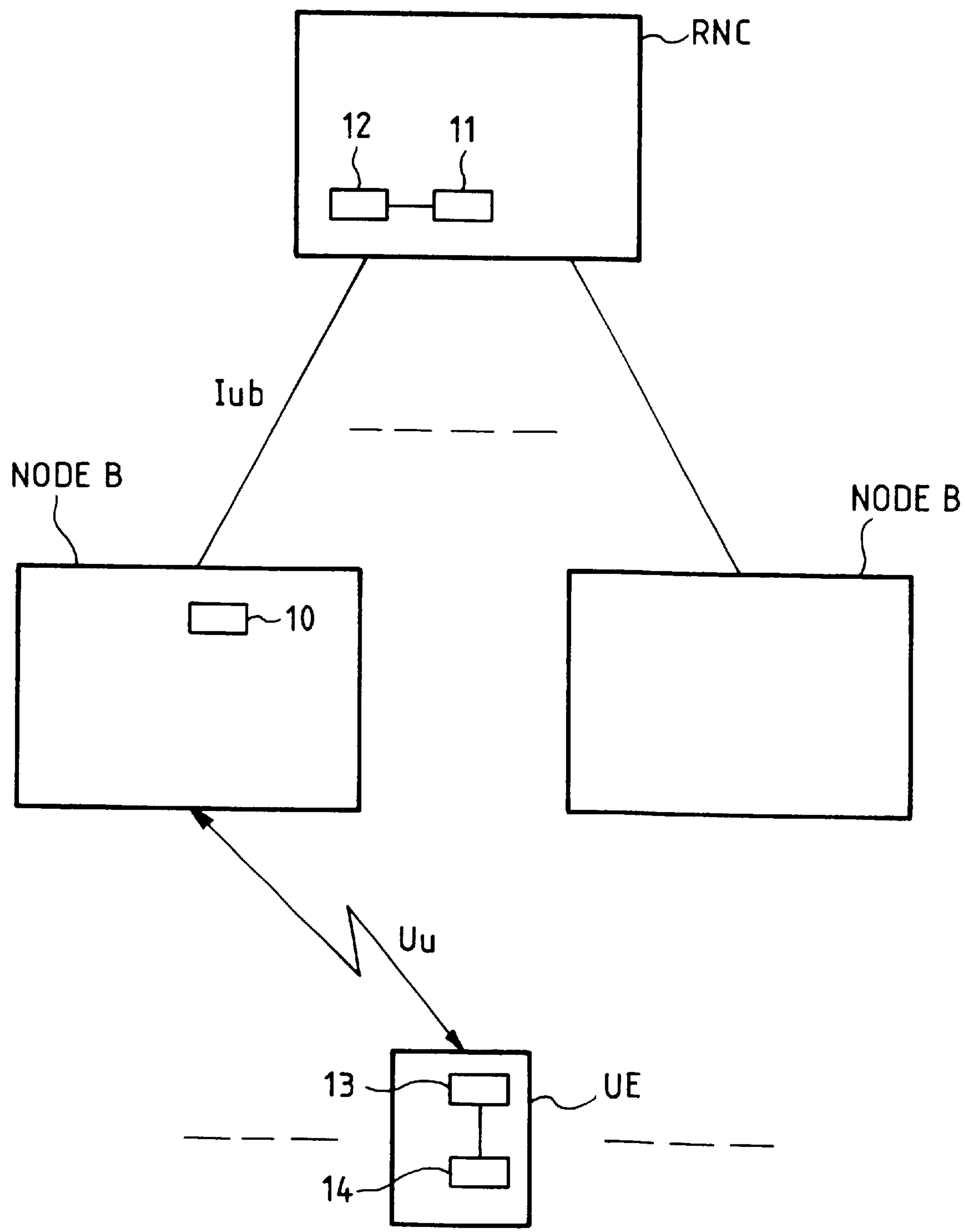

FIG_6
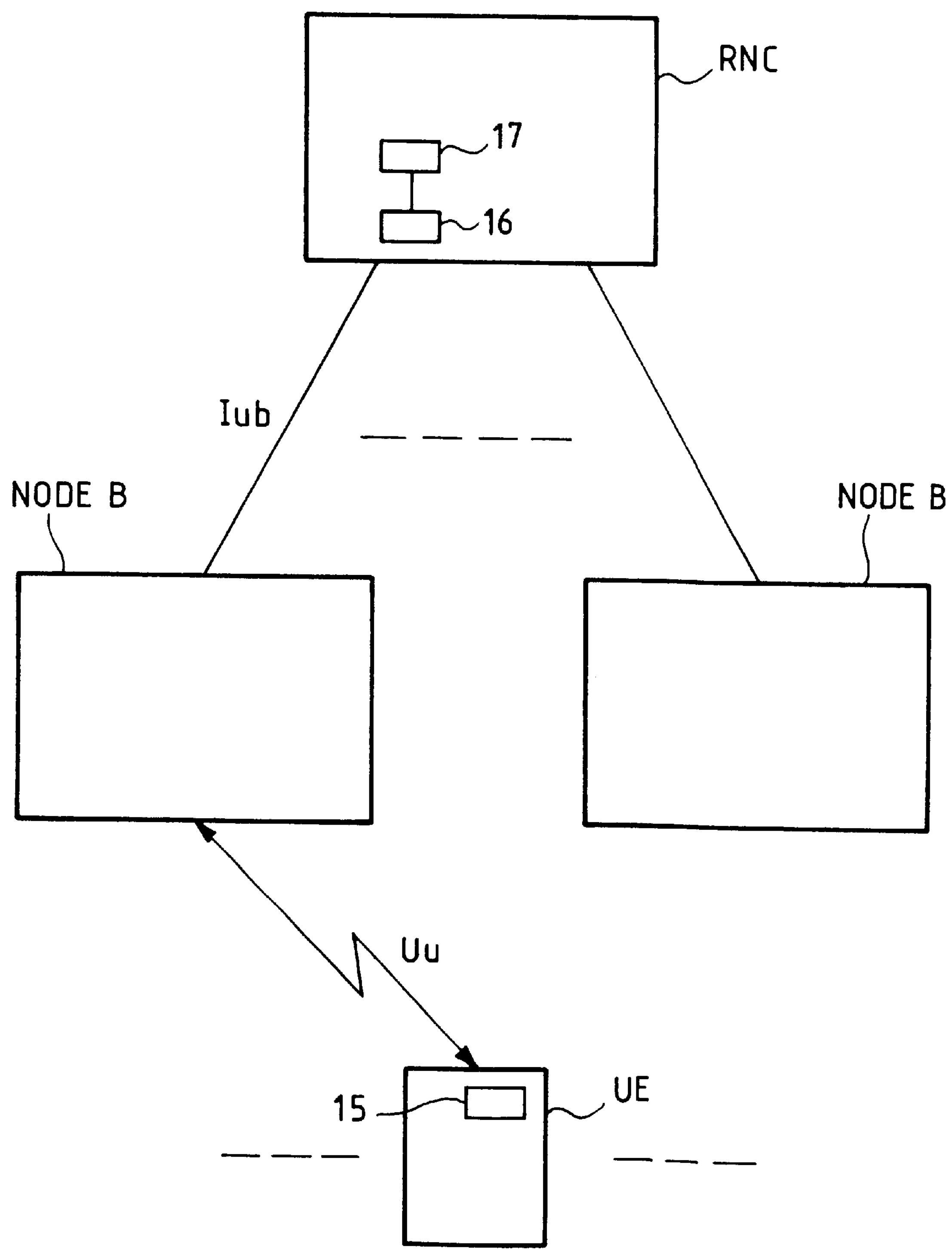

METHOD FOR IMPROVING PERFORMANCES OF A MOBILE RADIOCOMMUNICATION SYSTEM USING POWER CONTROL

BACKGROUND OF THE INVENTION

The present invention is generally concerned with mobile radiocommunication systems.

The present invention is more particularly concerned with power control used in such systems to improve performances (in terms of quality of service, of capacity, . . .etc.).

The present invention is in particular applicable to mobile radiocommunication systems of CDMA ("Code Division Multiple Access") type. In particular, the present invention is applicable to UMTS ("Universal Mobile Telecommunication Systems").

One type of power control which is used in CDMA systems is the so-called closed-loop power control.

The closed loop generally runs on a fast basis in order to adjust the transmission quality (generally represented by the SIR, or "Signal-to-Interference Ratio") around a transmission quality target value (generally a $SIR_{target}$ value), by sending appropriate power control commands back to the transmitter. The closed loop thus sends an "up" power control command back to the transmitter when the estimated SIR is below the $SIR_{target}$ value, or a "down" power control command otherwise.

The $SIR_{target}$ value is generally adjusted by a so-called outer loop. The outer loop generally runs on a slower basis in order to adjust the quality of service (generally represented by the BER, or "Bit Error Rate", or the FER, or "Frame Error Rate") around a quality of service target value (generally a BER or FER target value).

The outer loop thus increases the $SIR_{target}$ value when an estimated BER or FER is above a BER or FER target value, or reduces it otherwise.

Such an implementation may lead to such situations where the $SIR_{target}$ value is needlessly increased, therefore needlessly increasing the interference level in the system.

This may in particular be the case under such conditions as when the transmitter has already reached its maximum transmit power, or when the system has become overloaded. In such a case the $SIR_{target}$ value is uselessly increased, while this cannot result in any quality improvement. This may not be considered as a drawback in itself, as long as such conditions apply, but the $SIR_{target}$ value may therefore reach a too high value, and, when such conditions no longer apply, this will result in setting the transmit power at a level higher than necessary, therefore needlessly increasing the interference level in the system, until the algorithm reaches a correct value again.

The outer loop is usually implemented at the receiver side in order to reduce adaptation delays between quality measurements and $SIR_{target}$ setting. However, the receiver may not have means to know why the quality of service cannot be maintained with the current $SIR_{target}$ value, and, as indicated above, may try to increase if, even though the current $SIR_{target}$ value cannot be reached due to network overload for instance.

Therefore there is a need to provide a power control method avoiding such drawbacks.

SUMMARY OF THE INVENTION

An object of the present invention is therefore a method for improving performances of a mobile radiocommunication system using a power control loop which controls power according to a transmission quality target value, and an adjustment process for adjusting said transmission quality target value, a method wherein said adjustment process is limited, based on the thus controlled power reaching a maximum value.

According to another object of this invention, said limitation of said adjustment process includes not increasing said transmission quality target value if the thus controlled power has reached a maximum value.

According to another object of this invention, said mobile radiocommunication system is of CDMA type.

According to another object of this invention, said adjustment process is an outer loop which adjusts a quality of service around a quality of service target value.

According to another object of this invention, said power control is performed in a downlink transmission direction of said mobile radiocommunication system, using a downlink power control loop and a downlink adjustment process, and said downlink adjustment process is limited, based on the thus controlled power reaching a maximum value.

According to another object of this invention, said power control is performed in an uplink transmission direction of said mobile radiocommunication system, using an uplink power control loop and an uplink adjustment process, and said uplink adjustment process is limited, based on the thus controlled power reaching a maximum value.

The present invention also has for its object a mobile radiocommunication system for performing such a method, said mobile radiocommunication system being of the type comprising at least one mobile station in turn comprising means for performing said downlink adjustment process, and a mobile radiocommunication network in turn comprising at least one base station and at least one base station controller, and said system comprising means for limiting said downlink adjustment process, based on the controlled power of a base station transmitter reaching a maximum value.

According to another object of this invention, said limitation is performed for all mobile stations connected to said base station.

According to another object of this invention, said limitation is performed only for those mobile stations for which said base station transmitter cannot transmit the required power.

According to another object of this invention, said limitation is not performed for those mobile stations connected at the same time to other base stations, when the transmitter power of at least one of these other base stations does not reach a maximum value.

According to another object of this invention, a base station of such a system comprises:

- means for transmitting to a base station controller, information as to a base station transmitter reaching a maximum power value.

According to another object of this invention, a base station controller of such a mobile radiocommunication system comprises:

- means for receiving such information from a base station, and for providing a corresponding limitation information,
- means for transmitting such limitation information to at least one mobile station.

According to another object of this invention, a base station controller of such a mobile radiocommunication system comprises:

means for receiving power measurement reports from a base station, and for providing a limitation information, based on an information as to a base station transmitter reaching a maximum power value, deduced from such power measurement reports, means for transmitting such a limitation information to at least one mobile station.

According to another object of this invention, a mobile station of such a system comprises:

means for receiving such a limitation information from a base station controller, means for limiting said downlink adjustment process, based on such a limitation information.

The present invention also has for its object a mobile rodiocommunication system for performing such a method, said mobile rodiocommunication system being of the type comprising at least one mobile station and a mobile rodiocommunication network in turn comprising at least one base station and at least one base station controller, in turn comprising means for performing said uplink adjustment process, and said system comprising means for limiting said uplink adjustment process, based on the controlled power of a mobile station transmitter reaching a maximum value.

According to another object of this invention, a mobile station of such a such a system comprises:

means for transmitting to a base station controller information as to a mobile station transmitter reaching a maximum power value According to another object of this invention, a base station controller of such a system, comprises:

means for receiving such information from a mobile station, means for limiting said uplink adjustment process, based on such an information.

According to another object of this invention, a base station controller of such a system, comprises:

means for receiving power measurement reports, means for limiting said uplink adjustment process, based on an information as to a mobile station transmitter reaching a maximum power value, deduced from such power measurement reports.

BRIEF DESCRIPTION OF THE DRAWINGS

These and other objects of the present invention will become more apparent from the following description taken in conjunction with the accompanying drawings:

FIG. 1 is a diagram intended to illustrate a method according to the invention, FIG. 2 is a diagram intended to illustrate the general architecture of the radio access network, or "UTRAN" ("UMTS Terrestrial Radio Access Network"), of UMTS, FIG. 3 is a diagram intended to illustrate on example of signalling which may be used according to the invention for downlink power control, FIG. 4 is a diagram intended to illustrate an example of signalling which may be used according to the invention for uplink power control, FIG. 5 is a diagram intended to illustrate an example of means which may be used in a mobile radiocommunication system, to perform a method according to the present invention, for downlink power control, FIG. 6 is a diagram intended to illustrate an example of means which may be required in a mobile radiocommunication system, to perform a method according to the present invention, for uplink power control.

DETAILED DESCRIPTION OF THE INVENTION

The present invention thus has for its object a method for improving performances of a mobile radiocommunication system using a power control loop which controls power according to a transmission quality target value and an adjustment process for adjusting said transmission quality target value, a method wherein said adjustment process is limited, based on the thus controlled power reaching a maximum value.

Such a method may be illustrated by the diagram of FIG. 1, where:

1 refers to a power control loop, 2 refers to said adjustment process, 3 refers to providing an information as to the controlled power reaching a maximum value, 4 refers to a limitation of said adjustment process, based on the thus provided information.

Generally, such a method enables to optimise performances, by optimising the adjustment process.

In particular, by providing that no increase of the transmission quality target value is performed if said controlled power has reached a maximum value, this enables to avoid the above mentioned drowbacks Still in particular, by considering the current case where the adjustment process is the outer loop algorithm as mentioned above, and the power control loop is the closed loop as mentioned above, this may be expressed by the following algorithm:

If Outer loop requests an increase of $SIR_{target}$,

If Transmitter_Power_Saturation=TRUE, request is rejected

Else request is accepted

Where:

$Transmitter_{13\ Power13}$ Saturation is a boolean value set according to information provided by the transmitter side.

The present invention may be applied to uplink power control, downlink power control, or both uplink and downlink power control.

As compared to known methods, a method according to the invention may require additional signalling to be performed.

As an example, an application of the present invention to the UTRAN architecture of UMTS will be disclosed in the following.

As recalled in FIG. 2, the current UTRAN architecture comprises:

base stations, called "Node B", which communicate with mobile stations or "User Equipments" (UE) via a radio interface called "Uu", base station controllers, called "Radio Network Controllers" or RNC, which communicate with Nodes B via an interface called "lub" (each RNC controlling a plurality of Nodes B).

Within this architecture, for uplink power control the closed loop power control is currently implemented in Node B, while the outer loop algorithm is currently implemented in RNC; for downlink power control both loops are currently implemented in UE.

A method according to the invention may then require additional signalling to be performed, between UTRAN and UE, in order to indicate a situation of reaching a maximum power value at a transmitter side. In the following, as illustrated at FIG. 3 for downlink power control, or at FIG.

4 for uplink power control, such signalling is defined between RNC and UE.

As illustrated at FIG. 3, for downlink power control, a Node B first informs a RNC about the saturation of its power amplifier, as illustrated at 5. The RNC may then send a "OUTER_LOOP_CONTROL (ACTIVE)" message to all UEs being connected to this Node B, as illustrated at 6 for a given UE. For UE being in soft handover (i.e. being connected at the same time to other Nodes B), the PNC may send such a message only if all Nodes B involved in soft handover have indicated a saturation of their power amplifier. The UE then sets its "Transmitter_Power_Saturation" field to TRUE and thus prevents any increase of $SIR_{target}$. When the saturation has been resolved, Node B informs the RNC, as illustrated at 7. The RNC then sends a "OUTER_LOOP_CONTROL (RELEASE)" message to the UEs which have been previously limited, as illustrated at 8 for a given UE. For UE in soft handover, the message is sent as soon as one Node B involved in soft handover has indicated that saturation has been resolved The UE then sets its "$Transmitter_{13\ Power}13$ Saturation" field to FALSE and allows new increase of $SIR_{target}$.

Alternatively, the Node B may send power saturation messages indicating the UEs for which it cannot transmit the required power In this case, the RNC sends a imitation message only to the UEs which have been indicated by the Node B. For UEs in soft handover, the RNC sends a limitation message, only if all Nodes B involved in soft handover have indicated that they cannot transmit the required power to the UE.

Alternatively, the RNC may use power measurement reports sent by Node B to trigger messages towards UEs.

As illustrated at FIG. 4, for uplink power control, the UE sends a "POWER_MAX_REACHED" message to the RNC, as illustrated at 9, when its transmitter power exceeds a given threshold. The RNC then informs the local uplink outer loop to prevent from increasing $SIR_{target}$. When the transmitter power of the UE falls again below the threshold, a new message "$POWER_{13\ MAX13}$ RELEASE" is sent by the UE to the RNC, as illustrated at 9', which then allows a new increase of $SIR_{target}$.

Alternatively the RNC may use power measurements reports from the UE to trigger the limitation of the outer loop power control. In this case, no additional signalling on the air interface is required.

FIGS. 5 and 6 are intended to illustrate an example of means which may be used accordingly in these different entities, respectively for downlink and uplink power control.

As illustrated at FIG. 5, a Node B may thus comprise, besides other means which may be classical and which therefore are not mentioned here:

means 10 for transmitting to a RNC information as to its transmitter power reaching a maximum value.

As illustrated at FIG. 5, a RNC may thus comprise, besides other means which may be classical and which therefore are not mentioned here:

means 11 for receiving such information from a Node B, and for providing a corresponding limitation information, means 12 for transmitting such a limitation information to at least one user equipment UE (either to all user equipment UEs, or to some of them only, according to the different possibilities mentioned above)

As illustrated at FIG. 5, a UE may thus comprise, besides other means which may be classical and which therefore are not mentioned here:

means 13 for receiving such a limitation information from a RNC, means 14 for limiting said downlink adjustment process, based on such limitation information.

As illustrated at FIG. 6, a User Equipment (UE) may thus comprise, besides other means which may be classical and which therefore are not mentioned here:

means 15 for transmitting to a RNC information as to its transmitter reaching a maximum value .

A RNC may thus comprise, besides other means which may be classical and which therefore are not mentioned here:

means 16 for receiving such information from a UE, means 17 for limiting said uplink adjustment process, based on such information.

Means like 10 to 17 work together so as to perform the above-disclosed method. Such means do not need to be more fully disclosed than by their above disclosed function, for a person skilled in the art. Besides, the required signalling may be performed according to known types of signalling procedures in such types of systems, and therefore does not either require to be more fully disclosed, for a person skilled in the art.

What is claimed is:

1. A method for improving the performance of a mobile radiocommunication system using a power control loop which controls transmission power according to a transmission quality target value and an adjustment process for adjusting said transmission quality target value, a method wherein said adjustment process is limited, based on the thus controlled transmission power reaching a maximum transmission power value.

2. A method according to claim 1, wherein said limitation of said adjustment process includes not increasing said transmission quality target value if the thus controlled power has reached a maximum value.

3. A method according to claim 1, wherein said mobile radiocommunication system is of CDMA type.

4. A method according to claim 1, wherein said adjustment process is an outer loop which adjusts a quality of service around a quality of service forget value.

5. A method according to claim 1, wherein said power control is performed in a downlink transmission direction of said mobile radiocommunication system, using a downlink power control loop and a downlink adjustment process, and wherein said downlink adjustment process is limited, based on the thus controlled power reaching a maximum value.

6. A method according to claim 1, wherein said power control is performed in an uplink transmission direction of said mobile radiocommunication system, using an uplink power control loop and on uplink adjustment process, and wherein said uplink adjustment process is limited, based on the thus controlled power reaching a maximum value.

7. A mobile radiocommunication system for performing a method according to claim 5, said mobile radiocommunication system being of the type comprising at least one mobile station in turn comprising means for performing said downlink adjustment process, and a mobile radiocommunication network in turn comprising at least one base station and at least one base station controller, and said system comprising means for limiting said downlink adjustment process, based on the controlled power of a base station transmitter reaching a maximum value.

8. A system according to claim 7, wherein said limitation is performed for all mobile stations connected to said base station.

9. A system according to claim 7, wherein said limitation is performed only for those mobile stations for which said base station transmitter cannot transmit the required power.

10. A system according to claim 7, wherein said limitation is not performed or those mobile stations connected at the some time to other base stations, when the transmitter power of at least one of these other base stations does not reach a maximum value.

11. A base station of a mobile radiocommunication system according to claim 7, comprising:

means for transmitting to a base station controller, information as to a base station transmitter reaching a maximum power value.

12. A base station controller of a mobile radiocommunication system according to claim 7, comprising:

means for receiving information as to a base station transmitter reaching a maximum power value, and for providing a corresponding limitation information, means for transmitting such a limitation information to at least one mobile station.

13. A base station controller of a mobile radiocommunication system according to claim 7, comprising:

means for receiving power measurement reports from a base station, and for providing a limitation information, based on an information as to a base station transmitter reaching a maximum power value, deduced from such power measurement reports, means for transmitting such a limitation information to at least one mobile station.

14. A mobile station for a mobile radiocommunication system according to claim 7, comprising means for receiving a limitation information , from a base station controller, means for limiting said downlink adjustment process, based on such a limitation information.

15. A mobile radiocommunication system for performing a method according to claim 6, said mobile radiocommunication system being of the type comprising at least one mobile station, and a mobile radiocommunication network in turn comprising at least one base station and at least one base station controller, in turn comprising means for performing said uplink adjustment process, and said system comprising means for limiting said uplink adjustment process, based on the controlled power of a mobile station transmitter reaching a maximum value.

16. A mobile station for a system according to claim 15, comprising:

means for transmitting to a base station controller information as to a mobile station transmitter reaching a maximum power value.

17. A base station controller for a system according to claim 15, comprising:

means for receiving information as to a mobile station transmitter reaching a maximum power value, means for limiting said uplink adjustment process, based on such information.

18. A base station controller for a system according to claim 15, comprising:

means for receiving power measurement reports, means for limiting said uplink adjustment process, based on an information as to a mobile station transmitter reaching a maximum power value, deduced from such power measurement reports.

* * * * *